United States Patent [19]

Weber

[11] Patent Number: 4,778,489
[45] Date of Patent: Oct. 18, 1988

[54] PROCESS FOR SEPARATING A WATER INSOLUBLE DISTILLATE FROM AN AQUEOUS VAPOR

[75] Inventor: Klaus Weber, Hamburg, Fed. Rep. of Germany

[73] Assignee: Extraktionstechnik Gesellschaft fur Anlagenbau m.b.H., Hamburg, Fed. Rep. of Germany

[21] Appl. No.: 71,624

[22] Filed: Jul. 9, 1987

[30] Foreign Application Priority Data

Aug. 13, 1986 [DE] Fed. Rep. of Germany ....... 3627477

[51] Int. Cl.[4] .............................................. B01D 50/00
[52] U.S. Cl. .......................................... 55/23; 55/27; 55/85; 55/89
[58] Field of Search ...................... 55/23, 27, 85, 89

[56] References Cited

U.S. PATENT DOCUMENTS

| | | | |
|---|---|---|---|
| 2,784,806 | 3/1957 | Ferro, Jr. ................................. | 55/85 |
| 2,794,515 | 6/1957 | Schmalenbach et al. .......... | 55/85 X |
| 3,473,903 | 10/1969 | Paull et al. ......................... | 55/85 X |
| 4,055,404 | 10/1977 | Daimer ................................. | 55/85 |
| 4,121,913 | 10/1978 | Spevack ............................... | 55/89 |
| 4,188,195 | 2/1980 | Jablin .................................... | 55/89 |
| 4,188,290 | 2/1980 | Graham et al. ..................... | 55/85 X |
| 4,383,838 | 5/1983 | Barten et al. ....................... | 55/89 X |

*Primary Examiner*—Kathleen J. Prunner
*Attorney, Agent, or Firm*—Herbert Dubno

[57] ABSTRACT

The distillate which is contained in the prescrubbed vapors from the fatty acid fractionation or deodorization of oils and fats is obtained by mixture condensation in a cooling fluid fed into a principal flow of said vapors. A side flow enriched in distillate is drawn from the cooling fluid flow, liberated from the distillate and subsequently partially evaporated. The vapor formed thereby is advantageously used as a working vapor for drawing off and compressing the noncondensable gases contained in the prescrubbed vapors. The unevaporated residual fluid is cooled and used as the cooling fluid fed to the prescrubbed vapors. When an electrolyte solution is used as the cooling fluid, electrolyte loses are avoided and the dilution of the electrolyte solution caused by the mixture condensation is continuously compensated.

16 Claims, 1 Drawing Sheet

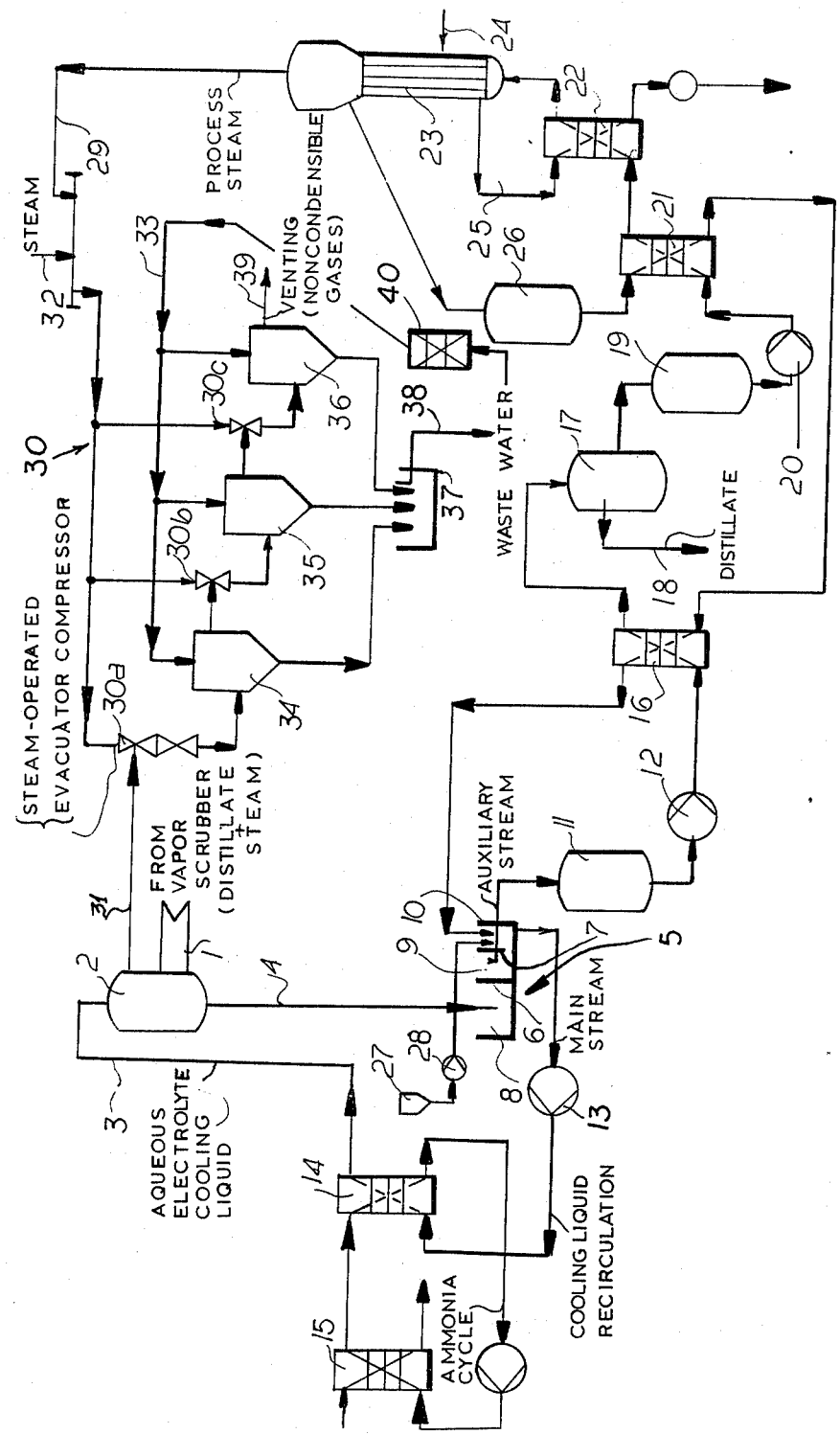

PROCESS FOR SEPARATING A WATER INSOLUBLE DISTILLATE FROM AN AQUEOUS VAPOR

FIELD OF THE INVENTION

My present invention relates to a process for separating a water insoluble distillate from an aqueous vapor and, more particularly, to a process for recovering a fat or fat associated material from water vapor or steam.

BACKGROUND OF THE INVENTION

A process for separating a water insoluble distillate from water vapor or steam is known comprising condensing the condensable components of the vapor by mixture condensation in a cooling fluid in which the cooling fluid mixed with the condensable vapors is separated into a distillate poor principal flow and a side flow enriched with distillate. Then the principal flow is cooled and recirculated.

Aqueous vapor which is loaded with water insoluble distillate, i.e. with fat and fat associated materials, is produced where steam distillation is carried out under vacuum, for example in the fatty acid fractionation or deodorization of fats and oils.

A large portion of the distillate is usually removed in a vapor wash device or scrubber.

However the vapor issuing from the vapor scrubber is still contaminated with distillate residue. Furthermore, noncondensable gases accompany it.

In practice it is known to reduce these aqueous vapors to the condensation pressure corresponding to the cooling water temperature by an ejector condenser and to condense them by mixture condensation. Thus a mixture made from vapor condensate, condensing working vapor and cooling water accumulates. It is also known to recirculate this cooling water by a cooling device and to split off a side flow rich in distillate from the circulation. In each case a water flow contaminated with distillate occurs.

The vapors can also be directly condensed by a cooling agent or electrolyte fed into the circulation, e.g a calcium chloride solution. Since a continuous diluton of the electrolyte occurs because of the condensable vapor constituents, fresh electrolyte must be continuously supplied. A salt containing side or auxiliary flow contaminated with distillate residue occurs as waste water.

The vapors can be condensed in a regenerative intermittently operating surface condenser which is maintained at the condensation temperature corresponding to the vacuum by ammonia, Freon or other refrigerants.

Since this condensation occurs below the triple point of water, the vapor condensate forms as ice on the surface which leads to intermittent operation by the continuously repeated cycle comprising condensation-icing, heating up and melting and cooling to the condensation temperature. In this process only the vapor condensate contaminated with distillate accumulates. The intermediate regenerative process requires additional energy consumption called for by the periodic heat up and melting and cooling of the condensed ice. All the usual problems of coupling continuously running processes, for example, those of the distillation with intermittent regeneratively running components, therefore results.

OBJECTS OF THE INVENTION

It is an object of my invention to provide an improved process for separating a water insoluble distillate, especially containing fat or fat associated material, from an aqueous vapor.

It is also an object of my invention to provide an improved process for separating a water insoluble distillate from an aqueous vapor in which the discharge of contaminated waste water is avoided with a minimal expense.

SUMMARY OF THE INVENTION

These objects and others which will become more readily apparent hereinafter are attained in accordance with my invention in a process for separating a water insoluble distillate from an aqueous vapor comprising condensing the condensable components of the vapor by mixture condensation in a cooling fluid, separating the cooling fluid mixed with the vapors into a distillate poor principal or main flow and a side or auxiliary flow enriched with distillate and cooling and recirculating the principal flow.

According to my invention the side flow with the cooling fluid after separation of the distillate is partially evaporated to form a process vapor and the cooled residue from the side flow not evaporated is fed into the cooling fluid circulation or flow.

It is particularly advantageous when the cooling fluid is an electrolyte solution. Then the electrolyte circulated with the side flow is fed back with an increased concentration into the cooling fluid circulation so that electrolyte loses are for all intents and purposes eliminated and the dilution caused by the mixture condensation is again reversed.

The invention can utilize the heat which is stored in the unevaporated cooling fluid from the side flow when the residue of the side flow not evaporated is cooled by heat exchange with the side flow.

The optimum use of the occurring vapors depends on the facts of the particular situation, especially on the economic relationships between steam and electrical energy processes.

When it is advantageous according to the given requirements, a product steam is used as a working or drive steam for drawing off and compressing the noncondensable gases formed in the usual mixture condensation.

So the inert gases can be drawn off and compressed free of waste water, the waste water produced by drawing off and compressing the noncondensable gases is cooled and is reused as a condensing means in drawing off and compressing the noncondensable gases.

When it is appropriate for any reason, the noncondensable gases are drawn off, e.g. by a rolling piston pump or by a rotary pump, and can be used for a preceding process step.

BRIEF DESCRIPTION OF THE DRAWING

The above and other objects, features and advantages of my invention will become more readily apparent from the following description, reference being made to the accompanying highly diagrammatic drawing in which the sole FIGURE is a flow chart showing the process for separating a water insoluble distillate from an aqueous vapor according to my invention.

SPECIFIC DESCRIPTION

Vapor already freed of some distillate from an unshown prior process step, e.g. from a vapor scrubber of a deodorizer, is fed to a mixer condenser 2 by a pipe 1.

There the condensable components, namely water with the accompanying small amounts of fat and fat associated materials, condense by contact with a cooling fluid, advantageously an aqueous electrolyte, supplied by a second pipe 3 at a low temperature, advantageously about $-10°$ to $-20°$ C., and at a correspondingly reduced pressure of less than 5 mbar, advantageously less than 2.5 mbar.

The diluted cooling fluid after being mixed with the vapor reaches a waste water vat 5 by a gravity pipe or downcomer 4 which guarantees a barometric seal.

The vat 5 is divided by one separating wall 6 and another separating wall 7 into three chambers 8, 9 and 10.

The chambers 9 and 10 are connected with each other at the bottom since a gap exists between the lower edge of the separating wall 7 and the bottom of the waste pipe vat 5.

The fluid fed to the chamber 8 flows to the chambers 9 and 10 over the upper edge of the separating wall 6. A floating layer forms on the surface of the fluid in the chamber 9 which is enriched in flocculated distillate. This layer is drawn away continuously in a side or auxiliary flow by a receiver 11 and a first pump 12.

The principal or main distillate poor flow is fed back from the bottom of the chamber 10 by a second pump 13 and through a condenser 14 in a circulation loop to the mixer condenser 2. The fluid which is warmed up by the mixer condensation is cooled in the cooler 14 by ammonia vapor which is also circulated in a loop. The ammonia is also fed through the condenser 15.

The side flow branching away from the vat 5 is warmed by a plate heat exchanger 16 to a temperature of about 60° C. so that the distillate is fluid. It arrives at a light fluid separator 17. There the distillate is drawn off by a pipe 18. It can be put to any use—e.g., it can be fed back to any of the previous process steps (not described here).

The side flow freed from distillate is drawn off by a receiver 19 and a third pump 20 into two additional heat exchangers 21 and 22 and subsequently to a vertical film evaporator 23 with a vapor head and a drop separator.

To heat the evaporator 23, steam is supplied by a pipe 24. The resulting hot condensate flows away through a pipe 25 and subsequently is used to preheat the side flow in the heat exchanger 22.

In the evaporator 23 only a partial flow of the supplied coolant fluid is evaporated at approximately 4 bar pressure. The unevaporated residue arrives in the heat exchanger 21 through the receiver 26 and from there in the heat exchanger 16.

After it has delivered the heat received in large part in the evaporator 23 to the side flow flowing to the evaporator, it is fed back into the chamber 10 of the waste vat 5. In this way the electrolyte accompanying the side flow arrives back in the cooling cycle with an increased concentration.

To compensate for leakage losses a more highly concentrated electrolyte is fed to the chamber 10 from a supply reservoir 27 with a dosing pump 28 to maintain the desired concentration.

The vapor produced in the evaporator 23 is fed by a conduit system 29 to the steam jet unit 30 (having steam-powered ejectors 30a, 30b, 30c) as a working or drive system, pumped away with the noncondensable gas arriving through a pipe 31 from the mixer condenser 2 and is compressed.

Additional steam can be fed in by a pipe 32, if necessary, e.g. in start up of the plant.

Cooling water is fed by a pipe 33 to the mixer condensers 34, 35 and 36 of the steam jet unit 30. The waste water occurring is collected in the waste water vessel 37 which serves as a barometric closure device for the mixer condenser 35 of the steam jet unit 30 and is fed back by a pipe 38 either into a duct system or after cooling in a cooling tower 40 to pipe 33. The noncondensable gas is vented to the atmosphere by a connecting pipe 39.

By "product" or "process vapor" I mean steam made from the side flow after branching from the principal distillate-poor flow.

I claim:

1. In a process for separating a water insoluble distillate from an aqueous vapor comprising condensing the condensable components of said vapor by mixture condensation in a cooling fluid, separating said cooling fluid mixed with said vapor into a distillate poor principal flow and a side flow enriched with distillate and cooling and recirculating said principal flow, the improvement comprising partially evaporating said cooling fluid forming said side flow after separation of said distillate to form a process vapor and feeding a cooled residue of said side flow not evaporated into a circulation path of said cooling fluid, whereby said process vapor made from said side flow is used as a working vapor for drawing off and compressing noncondensable gases contained in said aqueous vapor.

2. The improvement according to claim 1 wherein said cooling fluid is an electrolyte solution.

3. The improvement according to claim 1 wherein said residue of said side flow not evaporated is cooled by heat exchange with said side flow.

4. The improvement according to claim 1 wherein a waste water produced by drawing off and compressing said noncondensable gases is cooled and is reused as a condensing means for drawing off and compressing said noncondensable gases.

5. A process for separating a water insoluble distillate from an aqueous vapor comprising:
   condensing condensable components of said aqueous vapor by mixture condensation in a cooling fluid which is an electrolyte solution;
   separating said cooling fluid mixed with said aqueous vapor into a distillate poor principal flow and a side flow enriched with distillate;
   cooling and recirculating said principal flow;
   partially evaporating said side flow with said cooling fluid after separation of said distillate;
   cooling a residue of said side flow not evaporated by heat exchange with said side flow;
   feeding said cooled residue of said side flow not evaporated to said separating step;
   using a product vapor made from said side flow as a working vapor for drawing off and compressing noncondensable gases contained in said aqueous vapor; and
   cooling and reusing a waste water produced by the drawing off and compressing of said noncondensable gases as a condensing means for the drawing off and compressing of said noncondensable gases.

6. A process for the recovery of water insoluble distillate from steam vapors entraining same, said process comprising the steps of:
  (a) condensing condensable components from the steam vapors entraining said water insoluble distillate by mixing said steam vapors entraining said water insoluble distillate directly with a cooling liquid to form a condensate in said cooling liquid;
  (b) separating the cooling liquid containing the condensate formed in step (a) into a distillate-poor main stream and a distillate-enriched auxiliary stream;
  (c) cooling said main stream and recirculating the cooled main stream in a recirculating cooling liquid path as at least part of said cooling liquid to step (a);
  (d) separating distillate from said auxiliary stream to recover said distillate and form a cooling liquid residue;
  (e) partially evaporating said cooling liquid residue to form steam and a residual liquid;
  (f) supplying the steam produced in step (e) as process steam for use at least in part elsewhere in the process;
  (g) cooling the residual liquid formed in step (e);
  (h) feeding the cooled residual liquid from step (g) to said cooling liquid recirculation path; and
  (i) evacuating and compressing noncondensible gases contained in said vapors with a drive steam formed by said process steam.

7. The process defined in claim 6 wherein said cooling liquid is an electrolyte solution.

8. The process defined in claim 6 wherein a waste water is produced by the evacuation and compression of said noncondensible gases, said process further comprising the step of using said waste water as a condensing agent.

9. A process for the recovery of water insoluble distillate from steam vapors entraining same, said process comprising the steps of:
  (a) condensing condensable components from the steam vapors entraining said water insoluble distillate by mixing said steam vapors entraining said water insoluble distillate directly with a cooling liquid to form a condensate in said cooling liquid;
  (b) separating the cooling liquid containing the condensate formed in step (a) into a distillate-poor main stream and a distillate-enriched auxiliary stream;
  (c) cooling said main stream and recirculating the cooled main stream in a recirculating cooling liquid path as at least part of said cooling liquid to step (a);
  (d) separating distillate from said auxiliary stream to recover said distillate and form a cooling liquid residue;
  (e) partially evaporating said cooling liquid residue to form steam and a residual liquid;
  (f) supplying the steam produced in step (e) as process steam for use at least in part to produce the steam vapors entraining said distillate;
  (g) cooling the residual liquid formed in step (e); and
  (h) feeding the cooled residual liquid from step (g) to said cooling liquid recirculation path.

10. A process for the recovery of water insoluble distillate from steam vapors entraining same, said process comprising the steps of:
  (a) condensing condensable components from the steam vapors entraining said water insoluble distillate by mixing said steam vapors entraining said water insoluble distillate directly with a cooling liquid to form a condensate in said cooling liquid, and wherein said cooling liquid is an electrolyte solution;
  (b) separating the cooling liquid containing the condensate formed in step (a) into a distillate-poor main stream and a distillate-enriched auxiliary stream;
  (c) cooling said main stream and recirculating the cooled main stream in a recirculating cooling liquid path as at least part of said cooling liquid to step (a);
  (d) separating distillate from said auxiliary stream to recover said distillate and form a cooling liquid residue;
  (e) partially evaporating said cooling liquid residue to form steam and a residual liquid;
  (f) supplying the steam produced in step (e) as process steam for use at least in part elsewhere in the process;
  (g) cooling the residual liquid formed in step (e);
  (h) feeding the cooled residual liquid from step (g) to said cooling liquid recirculation path; and
  (i) evacuating and compressing noncondensible gases contained in said vapors with a drive steam formed by said process steam.

11. The process defined in claim 10 wherein the residual liquid is cooled in step (g) by indirect heat exchange with said auxiliary stream.

12. The process defined in claim 10 wherein a waste water is produced by the evacuation and compression of said noncondensible gases, said process further comprising the step of using said waste water as a condensing agent.

13. A process for the recovery of water insoluble distillate from steam vapors entraining same, said process comprising the steps of:
  (a) condensing condensable components from the steam vapors entraining said water insoluble distillate by mixing said steam vapors entraining said water insoluble distillate directly with a cooling liquid to form a condensate in said cooling liquid, and wherein said cooling liquid is an electrolyte solution;
  (b) separating the cooling liquid containing the condensate formed in step (a) into a distillate-poor main stream and a distillate-enriched auxiliary stream;
  (c) cooling said main stream and recirculating the cooled main stream in a recirculating cooling liquid path as at least part of said cooling liquid to step (a);
  (d) separating distillate from said auxiliary stream to recover said distillate and form a cooling liquid residue;
  (e) partially evaporating said cooling liquid residue to form steam and a residual liquid;
  (f) supplying the steam produced in step (e) as process steam for use at least in part to produce the steam vapors entraining said distillate;
  (g) cooling the residual liquid formed in step (e);
  (h) feeding the cooled residual liquid from step (g) to said cooling liquid recirculation path; and
  (i) evacuating and compressing noncondensible gases contained in said vapors with a drive steam formed by said process steam.

14. A process for the recovery of water insoluble distillate from steam vapors entraining same, said process comprising the steps of:

(a) condensing condensable components from the steam vapors entraining said water insoluble distillate by mixing said steam vapors entraining said water insoluble distillate directly with a cooling liquid to form a condensate in said cooling liquid;

(b) separating the cooling liquid containing the condensate formed in step (a) into a distillate-poor main stream and a distillate-enriched auxiliary stream;

(c) cooling said main stream and recirculating the cooled main stream in a recirculating cooling liquid path as at least part of said cooling liquid to step (a);

(d) separating distillate from said auxiliary stream to recover said distillate and form a cooling liquid residue;

(e) partially evaporating said cooling liquid residue to form steam and a residual liquid;

(f) supplying the steam produced in step (e) as process steam for use at least in part elsewhere in the process;

(g) cooling the residual liquid formed in step (e) by indirect heat exchange with said auxiliary stream;

(h) feeding the cooled residual liquid from step (g) to said cooling liquid recirculation path; and (i) evacuating and compressing noncondensible gases contained in said vapors with a drive steam formed by said process steam.

15. The process defined in claim 14 wherein a waste water is produced by the evacuation and compression of said noncondensible gases, said process further comprising the step of using said waste water as a condensing agent.

16. The process defined in claim 15 wherein said process steam is at least in part used to produce the steam vapors entraining said distillate.

* * * * *